(12) United States Patent
Nakamura et al.

(10) Patent No.: US 11,830,260 B2
(45) Date of Patent: Nov. 28, 2023

(54) PERSONAL IDENTIFICATION SYSTEM

(71) Applicant: SUBARU CORPORATION, Tokyo (JP)

(72) Inventors: Ryota Nakamura, Tokyo (JP); Taiyo Matsuhashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 178 days.

(21) Appl. No.: 17/538,136

(22) Filed: Nov. 30, 2021

(65) Prior Publication Data

US 2022/0207888 A1    Jun. 30, 2022

(30) Foreign Application Priority Data

Dec. 28, 2020   (JP) ................................ 2020-218515

(51) Int. Cl.

| | |
|---|---|
| *G06K 9/20* | (2006.01) |
| *G06K 9/36* | (2006.01) |
| *G06V 20/59* | (2022.01) |
| *G06V 40/50* | (2022.01) |
| *G06V 40/60* | (2022.01) |
| *G06V 40/16* | (2022.01) |
| *G06F 3/01* | (2006.01) |

(Continued)

(52) U.S. Cl.
CPC ............ *G06V 20/597* (2022.01); *B60K 35/00* (2013.01); *B60W 40/08* (2013.01); *G06F 3/013* (2013.01); *G06V 40/161* (2022.01); *G06V 40/171* (2022.01); *G06V 40/172* (2022.01); *G06V 40/50* (2022.01); *G06V 40/67* (2022.01); *B60K 2370/149* (2019.05); *B60K 2370/1529* (2019.05); *B60W 2040/0809* (2013.01); *B60W 2540/043* (2020.02); *B60W 2540/225* (2020.02)

(58) Field of Classification Search
CPC ...... G06V 40/16–40/179; G06V 40/67; G06V 20/597; G06V 40/50
See application file for complete search history.

(56) References Cited

U.S. PATENT DOCUMENTS

| | | | |
|---|---|---|---|
| 11,100,349 B2 * | 8/2021 | Cohen | ..................... G06F 21/32 |
| 2016/0255303 A1 | 9/2016 | Tokui | |
| 2019/0071055 A1 * | 3/2019 | Luchner | ................. B60R 25/25 |

FOREIGN PATENT DOCUMENTS

JP       2019-075162 A       5/2019

* cited by examiner

*Primary Examiner* — Brian Werner
(74) *Attorney, Agent, or Firm* — McDermott Will & Emery LLP

(57) ABSTRACT

A personal identification system to be applied to a vehicle includes first and second display units, an imaging unit, a display image processor, and a personal identification processor. The first display unit is provided vehicle-widthwise halfway and vehicle-lengthwise in front of a driver's seat of the vehicle. The second display unit fronts onto the driver's seat. The imaging unit is provided on the outer periphery of the first display unit. The personal identification processor makes personal registration and personal identification of a driver seated on the driver's seat based on at least first and second facial images. The first facial image includes an image of the driver's face captured by the imaging unit with the driver's gaze directed toward the first display unit. The second facial image includes an image of the driver's face captured by the imaging unit with the driver's gaze directed toward the second display unit.

17 Claims, 8 Drawing Sheets

(51) Int. Cl.
*B60K 35/00* (2006.01)
*B60W 40/08* (2012.01)

PERSONAL IDENTIFICATION SYSTEM

CROSS-REFERENCE TO RELATED APPLICATIONS

This application claims priority from Japanese Patent Application No. 2020-218515 filed on Dec. 28, 2020, the entire contents of which are hereby incorporated by reference.

BACKGROUND

The technology relates to a personal identification system.

Driver monitoring systems have been known that monitor a driver's state for purposes of assistance with safe driving of vehicles.

In such a driver monitoring system, personal data for personal identification is registered in the system, to identify a person who drives the vehicle.

As the data for the personal identification, facial images are generally used. Techniques have been disclosed that include extracting, for example, facial data and gaze data from images captured by a camera. For example, reference is made to Japanese Unexamined Patent Application Publication (JP-A) No. 2019-75162.

SUMMARY

An aspect of the technology provides a personal identification system to be applied to a vehicle. The personal identification system includes a first display unit, a second display unit, an imaging unit, a display image processor, a personal identification processor. The first display unit is provided vehicle-widthwise halfway and vehicle-lengthwise in front of a driver's seat of the vehicle. The second display unit fronts onto the driver's seat. The imaging unit is provided on the outer periphery of the first display unit. The display image processor is configured to control a display image to be displayed on the first display unit and a display image to be displayed on the second display unit. The personal identification processor is configured to make personal registration and personal identification of a driver seated on the driver's seat on the basis of at least a first facial image and a second facial image. The first facial image includes an image of the driver's face captured by the imaging unit with the driver's gaze directed toward the first display unit. The second facial image includes an image of the driver's face captured by the imaging unit with the driver's gaze directed toward the second display unit.

An aspect of the technology provides a personal identification system to be applied to a vehicle. The personal identification system includes a first display unit, a second display unit, an imaging unit, and circuitry. The first display unit is provided vehicle-widthwise halfway and vehicle-lengthwise in front of a driver's seat of the vehicle. The second display unit fronts onto the driver's seat. The imaging unit provided on the outer periphery of the first display unit. The circuitry is configured to control a display image to be displayed on the first display unit and a display image to be displayed on the second display unit. The circuitry is configured to make personal registration and personal identification of a driver seated on the driver's seat on the basis of at least a first facial image and a second facial image. The first facial image includes an image of the driver's face captured by the imaging unit with the driver's gaze directed toward the first display unit. The second facial image includes an image of the driver's face captured by the imaging unit with the driver's gaze directed toward the second display unit.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
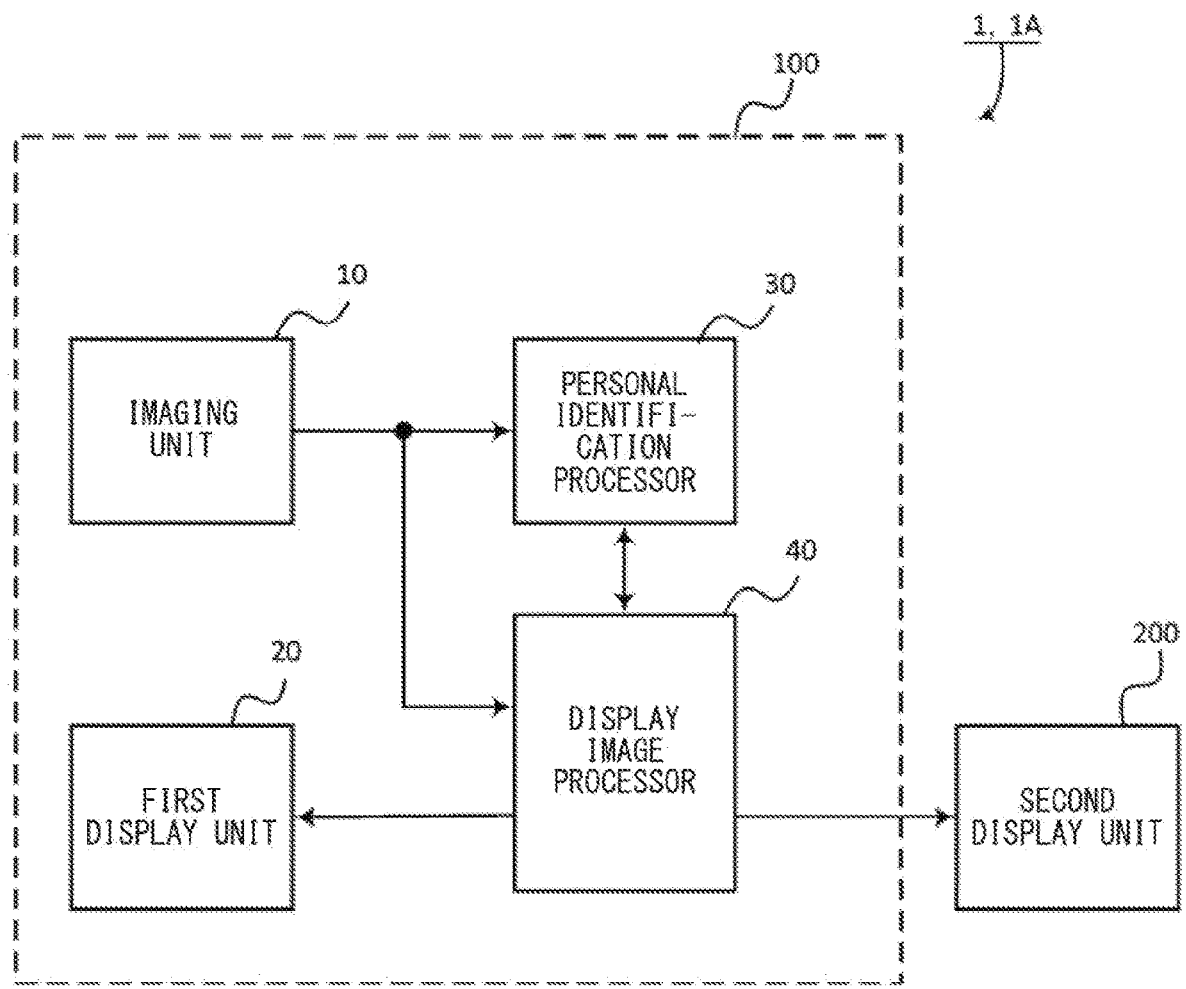
FIG. 1 illustrates a configuration of a personal identification system according to a first embodiment of the disclosure.

Driver monitoring systems make registration of personal data for personal identification. Non-limiting examples of the personal data may include a facial image captured by a camera in a vehicle, and an amount of a facial feature extracted from the facial image. Driver monitoring systems compare an amount of a feature extracted from a facial image of a driver currently seated on a driver's seat, to the registered amount of the feature, to identify a person currently seated on the driver's seat.

In the facial image acquired on the occasion of the registration of the personal data, however, a facial pose and a gaze direction of the driver are not fixed uniquely. For example, depending on the facial pose, precise extraction of the amount of the facial feature becomes difficult, resulting in hinderance to correct personal identification.

It is desirable to provide a personal identification system that makes it possible to acquire a facial image in which a facial pose and a gaze direction of a driver are uniquely fixed, on the occasion of registration of personal data.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Embodiment

A personal identification system 1 according to a first embodiment of the technology is described with reference to FIGS. 1 to 5.

<Configuration of Personal Identification System 1>

As illustrated in FIG. 1, the personal identification system 1 according to this embodiment may include, without limitation, a driving state monitoring device 100 and a second display unit 200.

Figure 2:
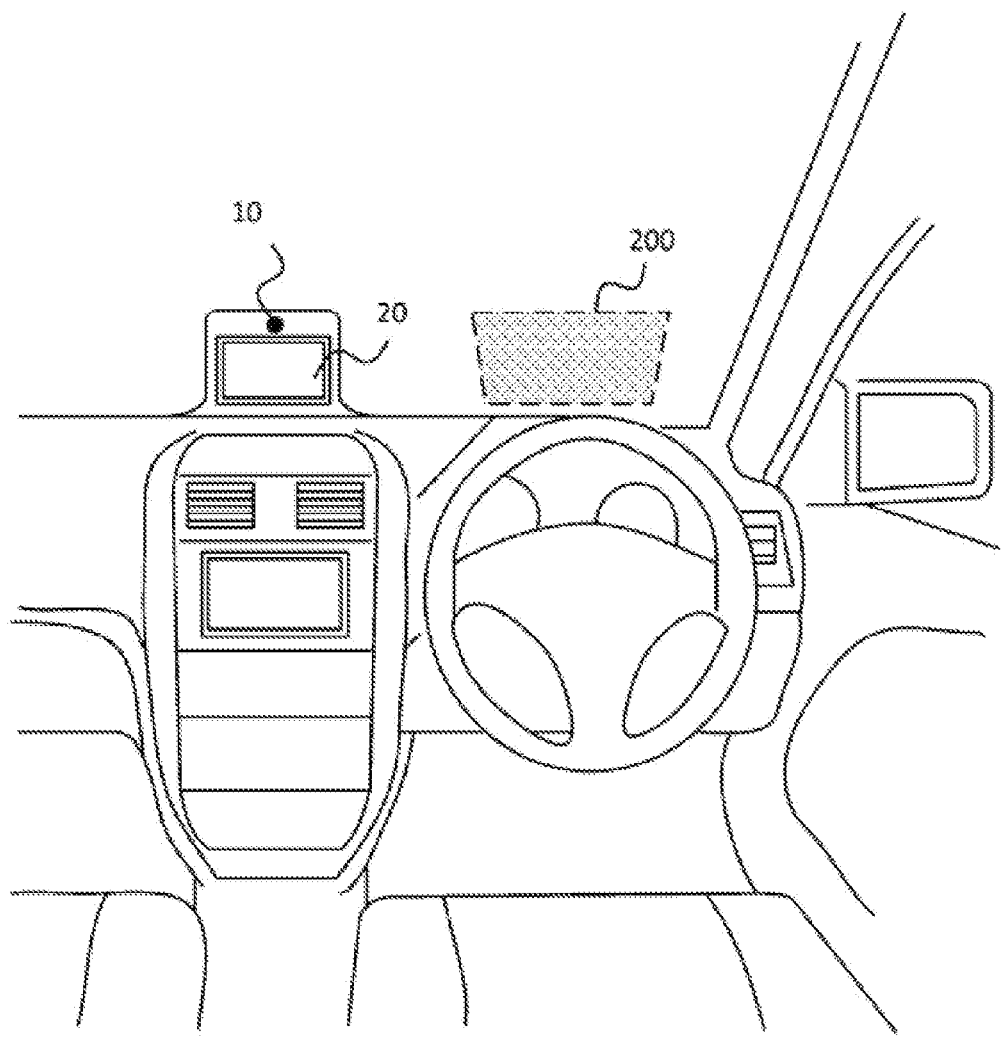
FIG. 2 illustrates an arrangement of an imaging unit, a first display unit, and a second display unit, in the personal identification system according to the first embodiment of the disclosure.

As illustrated in FIG. 2, the driving state monitoring device 100 may acquire a facial image of a driver of a vehicle, with an imaging unit 10 described later. The driving state monitoring device 100 may extract a feature point of the facial image acquired. On the basis of a state of the feature point extracted, the driving state monitoring device 100 may monitor a driving state of the driver. Non-limiting example of the state of the feature point may include a facial pose and an opening state of an eye.

It is to be noted that a detailed configuration is described later.

As illustrated in FIG. 2, the second display unit 200 fronts onto a driver's seat. The second display unit 200 may include, for example, a head-up display (HUD) that displays an image of basic data for the driver on a front windshield.

It is to be noted that in the example of FIG. 2, the second display unit 200 may include the HUD that projects an image on the windshield, but the second display unit 200 may include an HUD that projects an image on a combiner provided on a dashboard.

In this embodiment, the second display unit 200 is not limited to an HUD but may include any display unit that displays an image right in front of the driver's seat.

<Configuration of Driving State Monitoring Device 100>

As illustrated in FIG. 1, the driving state monitoring device 100 may include, without limitation, the imaging unit 10, a first display unit 20, a personal identification processor 30, and a display image processor 40.

As illustrated in FIG. 2, the imaging unit 10 may be provided on the outer periphery of the first display unit 20 described later. The imaging unit 10 may acquire an image including at least the face of the driver seated on the driver's seat. The image to be acquired may include a moving image and a still image.

The imaging unit 10 may include, without limitation, a camera that incorporates an imaging element such as a CCD (Charge Coupled Device) or a CIS (CMOS Image Sensor).

Moreover, the imaging unit 10 may include, without limitation, a near-infrared camera or an RGB camera. The imaging unit 10 may receive reflected light of near-infrared light irradiation, to capture the driver's face. The imaging unit 10 may send a captured image signal to the personal identification processor 30 and the display image processor 40 described later.

As illustrated in FIG. 2, the first display unit 20 may include an indicator disposed vehicle-widthwise halfway and vehicle-lengthwise in front of the driver's seat. The first display unit 20 may provide the driver with display of data regarding, for example, personal registration.

It is to be noted that the first display unit 20 may also serve as a display unit of a navigation system mounted on the vehicle.

The personal identification processor 30 may extract an amount of a facial feature from an image captured by the imaging unit 10 and identify the driver on the basis of the amount of the facial feature.

Moreover, on the occasion of registration of personal data, the personal identification processor 30 may store the amount of the facial feature in an unillustrated memory. The amount of the facial feature is provided for personal identification based on the facial image of the driver captured by the imaging unit 10.

In this example, the personal identification processor 30 may include, without limitation, a portion of a known, unillustrated CPU (Central Processing Unit) including, for example, a RAM (Random Access Memory), a ROM (Read Only Memory), and I/O (Input/Output) buses, etc., and execute a control in accordance with a control program held in the ROM.

The display image processor 40 is configured to generate an image to be displayed on the first display unit 20 and an image to be displayed on the second display unit 200.

In this example, the display image processor 40 may include, without limitation, a portion of a known, unillustrated GPU (Graphics Processing Unit) including, for example, a RAM, a ROM, and I/O buses, etc., and execute a control in accordance with a control program held in the ROM.

<Processing in Personal Identification System 1>

Figure 3:
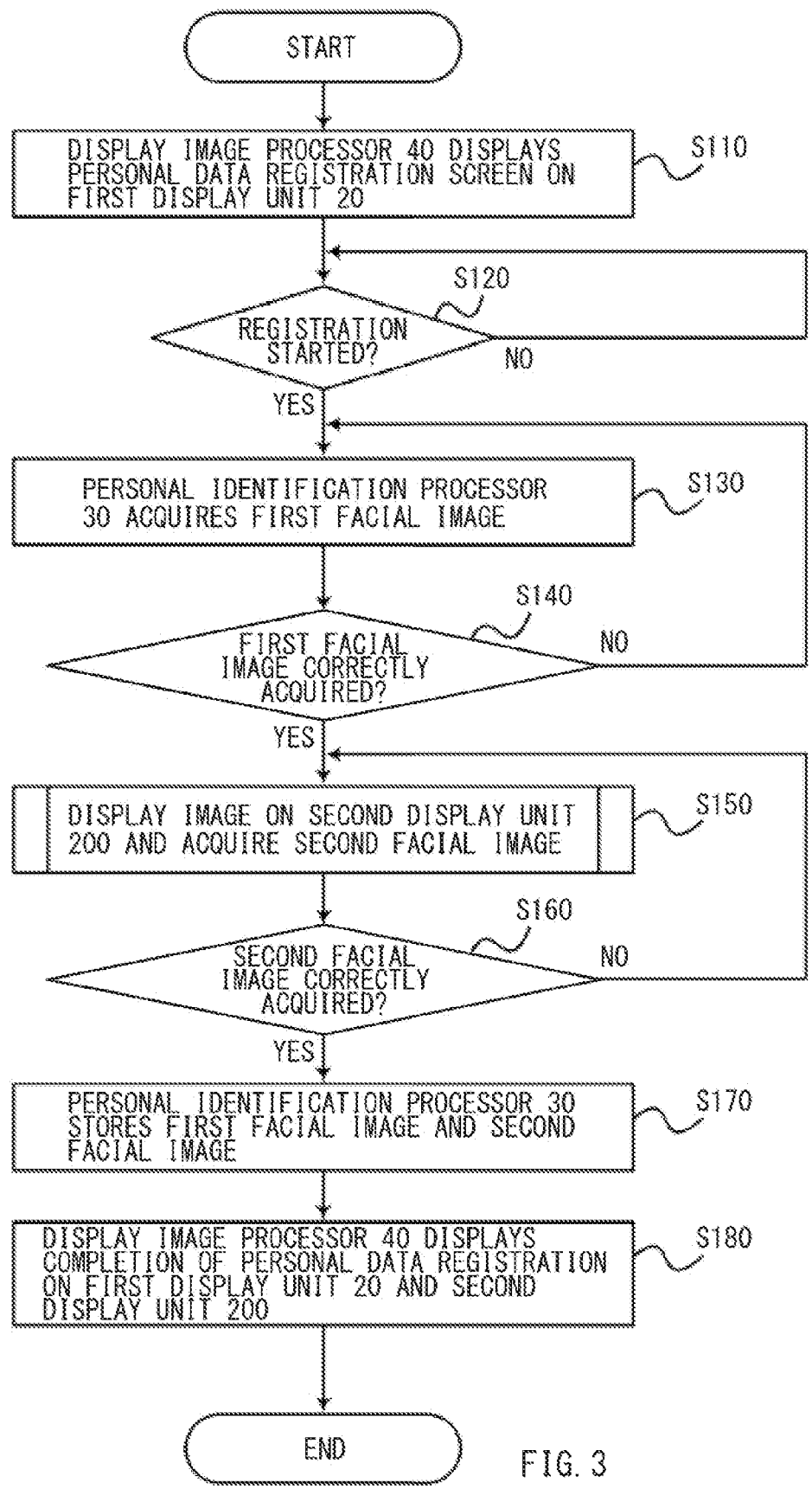
FIG. 3 is a flowchart of personal registration processing, in the personal identification system according to the first embodiment of the disclosure.
Figure 5:
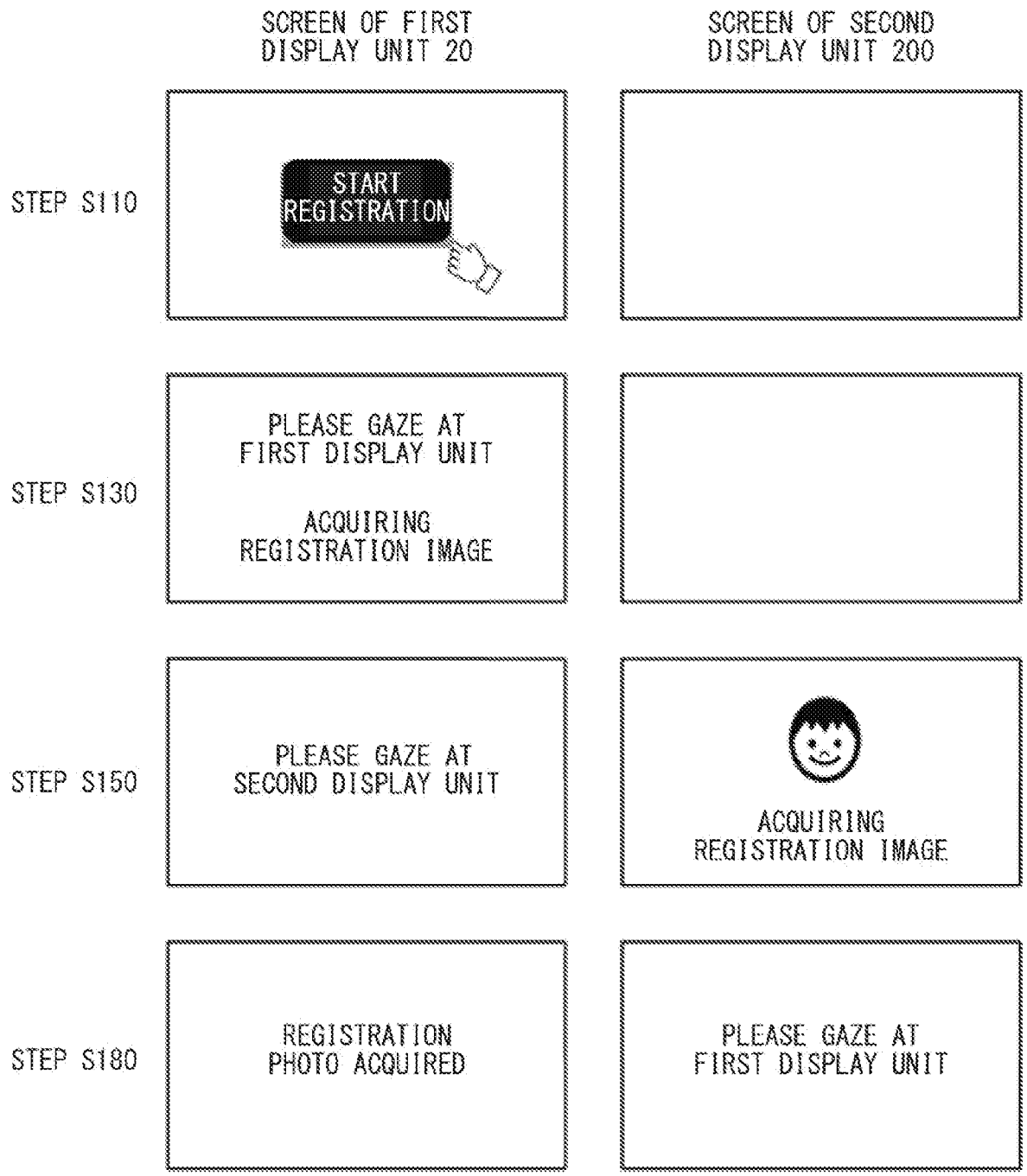
FIG. 5 illustrates transitions of images to be displayed on the first display unit and the second display unit, on the occasion of personal registration in the personal identification system according to the first embodiment of the disclosure.

Description is given of processing in the personal identification system 1 according to this embodiment with reference to FIGS. 3 and 5.

In the following, with reference to FIG. 3, described is processing to be carried out on the occasion of the registration of the personal data in the personal identification system 1.

Moreover, FIG. 5 illustrates display examples of screens to be displayed on the first display unit 20 and the second display unit 200 as the processing flow illustrated in FIG. 3 is carried out.

The display image processor 40 may display a personal data registration screen on the first display unit 20 (step S110).

Thereafter, the display image processor 40 may determine whether or not an operation has been made for a start of the registration on the personal data registration screen (step S120). In a case where the operation for the start of the registration has not been made ("NO" in step S120), the display image processor 40 may cause the processing to return to step S120 and stand by. In a case where the operation for the start of the registration has been made ("YES" in step S120), the display image processor 40 may cause the processing to proceed to step S130.

The personal identification processor 30 may acquire the facial image (first facial image) of the driver from the imaging unit 10 (step S130). The image the imaging unit 10 acquires on this occasion is the facial image of the driver gazing at the first display unit 20 (first facial image).

Accordingly, the first display unit 20 may provide, on the first display unit 20, display that prompts the driver to gaze at the first display unit 20.

Moreover, an input of the start of the registration (step S120) may be made by an operation on, for example, a touch screen provided on the first display unit 20 or a button located around the first display unit 20. This makes it possible to allow the facial pose of the driver to be directed toward the first display unit 20.

Thereafter, the personal identification processor 30 may confirm whether or not the facial image (first facial image) of the driver acquired in step S130 has been acquired correctly (step S140).

The personal identification processor 30 may further confirm whether or not the facial pose of the acquired facial image falls within a predetermined range, to extract an amount of a facial feature from the acquired facial image (first facial image). The amount of the facial feature is necessary for the personal identification processor 30 to identify the driver.

In one example, the personal identification processor 30 may extract the facial pose (yaw, pitch, and roll) from the acquired facial image (first facial image) of the driver, and determine whether or not the facial pose falls within the predetermined range.

In a case where the facial pose of the facial image (first facial image) of the driver does not fall within the predetermined range ("NO" in step S140), the personal identification processor 30 may cause the processing to return to step S130 and acquire the facial image (first facial image) of the driver again.

In a case where the facial pose of the facial image (first facial image) of the driver falls within the predetermined range ("YES" in step S140), the personal identification processor 30 may cause the processing to proceed to step S150.

In the forgoing description, the example is given in which the personal identification processor 30 confirms once that the facial pose falls within the predetermined range. However, the personal identification processor 30 may make the confirmation a plurality of times. In this case, the personal identification processor 30 may acquire the facial image with the facial pose within the predetermined range a plurality of times, and determine the amount of the facial feature of the driver on the basis of a plurality of the acquired facial images.

Thereafter, the display image processor 40 may display, on the first display unit 20, an instruction to prompt the driver to gaze at the second display unit 200, and display an image on the second display unit 200. Thus, the personal identification processor 30 may acquire the facial image (second facial image) of the driver (step S150).

Details of the process of step S150 are described later.

Thereafter, the personal identification processor 30 may confirm whether or not the facial image (second facial image) of the driver acquired in step S150 has been acquired correctly (step S160).

The personal identification processor 30 may further confirm whether or not the facial pose of the facial image (second facial image) of the driver acquired in step S150 falls within a predetermined range.

In a case where the facial pose of the facial image (second facial image) of the driver does not fall within the predetermined range ("NO" in step S160), the personal identification processor 30 may cause the processing to return to step S150 and acquire the facial image (second facial image) of the driver again.

In a case where the facial pose of the facial image (second facial image) of the driver falls within the predetermined range ("YES" in step S160), the personal identification processor 30 may cause the processing to proceed to step S170.

As with the example process given in the process of step S140, the process of step S160 may be changed to a process of confirming that the facial pose falls within the predetermined range a plurality of times. In this case, the personal identification processor 30 may acquire the facial image (second facial image) with the facial pose within the predetermined range a plurality of times, and determine the amount of the facial feature of the driver on the basis of a plurality of the acquired facial images (second facial images).

The personal identification processor 30 may store the facial image (first facial image) of the driver acquired in step S130 and the facial image (second facial image) of the driver acquired in step S150 in an unillustrated memory (step S170).

Data regarding the facial images may be associated with, for example, data such as the name, the sex, and the age of the driver, and stored in the memory as the personal data.

Thereafter, the display image processor 40 may provide, on the first display unit 20 and the second display unit 200, display of completion of the registration of the personal data (step S180), and end the processing.

<Image Processing for Display on Second Display Unit 200 (Step S150)>

Figure 4:
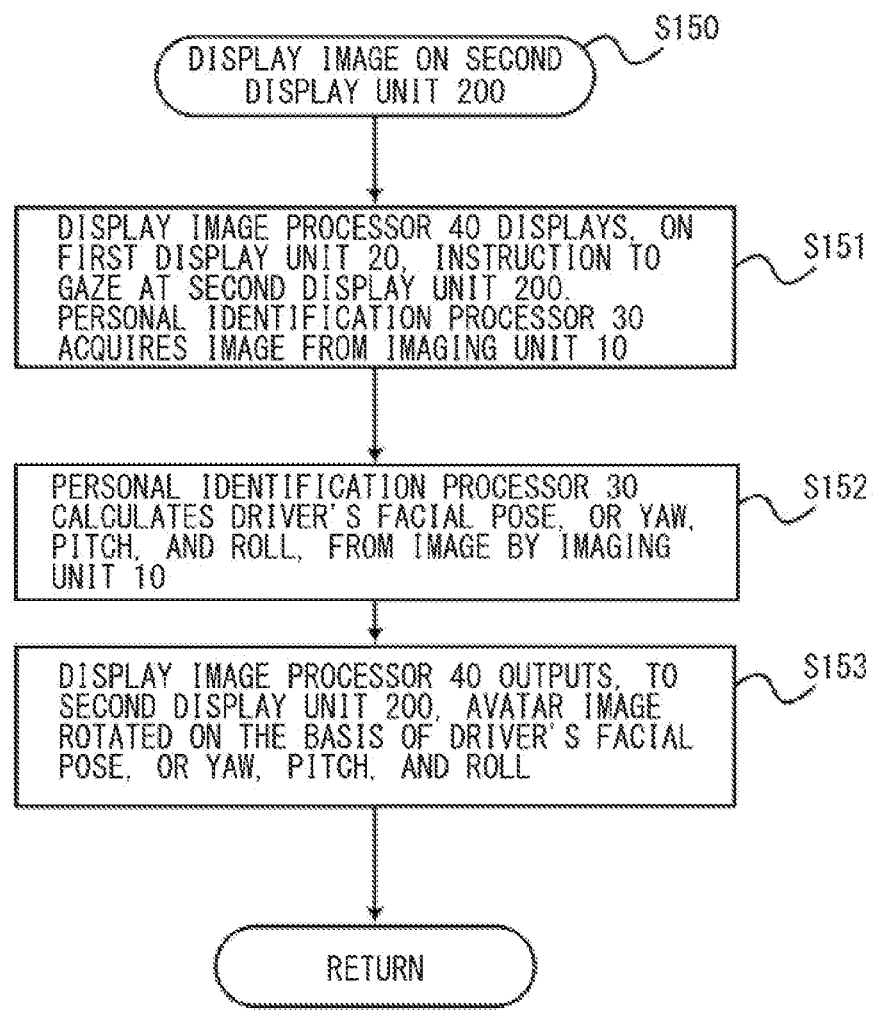
FIG. 4 is a flowchart of image output processing to the second display unit, in the personal identification system according to the first embodiment of the disclosure.

Processing to be carried out in step S150 in FIG. 3 is described with reference to FIG. 4. The processing is related to image generation for display on the second display unit 200 and the acquisition of the second facial image.

The display image processor 40 may display, on the first display unit 20, an instruction to gaze at the second display unit 200. Thereafter, the personal identification processor 30 may acquire the facial image (second facial image) of the driver from the imaging unit 10 (step S151).

Thereafter, the personal identification processor 30 may calculate the facial pose (yaw, pitch, and roll) of the driver on the basis of the acquired facial image (second facial image), and transfer a result of the calculation to the display image processor 40 (step S152).

The display image processor 40 may read a three-dimensional (3-D) avatar image held in the unillustrated memory on the basis of the transferred data regarding the facial pose of the driver. The display image processor 40 may rotate the 3-D avatar image, and display the avatar image as illustrated in FIG. 5 on the second display unit 200 (step S153). The display image processor 40 may cause the processing to return to step S160 in FIG. 3.

The facial image of the driver acquired in step S151 is the facial image captured from an oblique direction. Accordingly, the display image processor 40 may rotate the 3-D avatar image on the basis of the facial pose calculated from the image and a direction in which the second display unit 200 is disposed.

In other words, the display image processor 40 may carry out a process of rotating the avatar image, to display the front-faced 3-D avatar image on the second display unit 200 when the driver turned his or her face toward the second display unit 200.

The display image processor 40 may continue displaying the 3-D avatar image on the second display unit 200 until the second facial image is correctly acquired. That is, the display image processor 40 may continuously display, on the second display unit 200, the 3-D avatar image the facial pose of which is matched with the facial pose of the driver.

<Workings and Effects>

As described above, the personal identification system 1 according to this embodiment includes the imaging unit 10, the personal identification processor 30, the display image processor 40, the first display unit 20, and the second display unit 200. The first display unit 20 is provided vehicle-widthwise halfway and vehicle-lengthwise in front of the driver's seat. The second display unit 200 fronts onto the driver's seat. The imaging unit 10 is provided on the outer periphery of the first display unit 20 and configured to capture the facial image of the driver. The display image processor 40 is configured to control the display image to be displayed on the first display unit 20 and the display image to be displayed on the second display unit 200. The personal identification processor 30 makes the personal registration and the personal identification of the driver on the basis of at least the first facial image and the second facial image. The first facial image is captured by the imaging unit 10 with the driver's gaze directed toward the first display unit 20. The second facial image is captured by the imaging unit 10 with the driver's gaze directed toward the second display unit 200.

That is, in acquiring the first facial image, the image by the display image processor 40 is displayed on the first display unit 20. This makes it possible to fix the facial pose and a gaze direction of the driver uniquely toward the first display unit 20. In acquiring the second facial image, the image by the display image processor 40 is displayed on the second display unit 200. This makes it possible to fix the facial pose and the gaze direction of the driver uniquely toward the second display unit 200.

Hence, it is possible to extract precisely the amount of the facial feature of the driver from the first facial image and the second facial image, leading to enhanced precision of the personal identification.

Furthermore, the second facial image may also be used as a registration image that simulates the driver driving the vehicle.

Moreover, in the personal identification system 1 according to this embodiment, on the occasion that the personal identification processor 30 makes the personal registration, the display image processor 40 may display, on the second display unit 200, the image in which the facial pose of the avatar is controlled on the basis of facial pose data extracted from the second facial image.

That is, in acquiring the second facial image, the avatar image may be displayed on the second display unit 200. The avatar image moves in accordance with the facial pose of the driver. This prompts the driver to gaze at the second display unit 200 more closely, making it possible to fix uniquely the facial pose and the gaze direction of the driver.

Hence, it is possible to extract precisely the amount of the facial feature of the driver from the second facial image, leading to enhanced precision of the personal identification.

In addition, it is possible to generate the avatar image to be displayed on the second display unit, solely by the process of rotating the avatar image held in advance in the memory. Hence, it is possible to provide the avatar image without increasing a processing load on the personal identification system 1.

This saves the display image processor 40 a high-performance GPU and a large-capacity memory, etc. Hence, it is possible to provide the personal identification system 1 at low costs.

In the personal identification system 1 according to this embodiment, on the occasion of the personal registration of the driver, the personal identification processor 30 may acquire the first facial image. Afterwards, the display image processor 40 may display the image on the second display unit 200, and the personal identification processor 30 may acquire the second facial image.

That is, until the completion of the acquisition of the first facial image with the driver's gaze directed toward the first display unit 20, the display image processor 40 does not display anything on the second display unit 200. This makes it clear which display unit the driver is supposed to gaze at. Accordingly, it is possible to fix the facial pose and the gaze direction uniquely.

Hence, it is possible to extract precisely the amount of the facial feature of the driver from the first facial image and the second facial image, leading to enhanced precision of the personal identification.

Furthermore, on the occasion of the personal registration, the display image processor 40 may display the image on the second display unit 200. This makes it possible to guide the facial pose and the gaze direction of the driver. Hence, it is possible to make the registration processing of the facial image of the driver in a short time without waste.

In the personal identification system 1 according to this embodiment, the second display unit 200 may include the head-up display.

That is, because of characteristics of the head-up display, an eye level for a gaze at an image is considerably limited, as compared with a liquid crystal screen. Accordingly, the use of the head-up display leads to further limitation on the facial pose and the gaze direction of the driver.

Hence, it is possible to extract precisely the amount of the facial feature of the driver from the second facial image, leading to enhanced precision of the personal identification.

In addition, the personal identification system 1 according to this embodiment may include the driving state monitoring device 100 configured to monitor the driving state of the driver. The imaging unit 10, the personal identification processor 30, the display image processor 40, and the first display unit 20 may be provided in the driving state monitoring device 100.

That is, in the case where the vehicle includes the driving state monitoring device 100 configured to monitor the driving state of the driver, the combined use of the imaging unit 10, the personal identification processor 30, the display image processor 40, and the first display unit 20 makes it possible to constitute a personal identification system.

Hence, adding solely the second display unit 200 makes it possible to constitute the personal identification system 1, leading to cost reduction.

Second Embodiment

A personal identification system 1A according to a second embodiment of the technology is described with reference to FIGS. 6 and 7.

This embodiment is changed from the personal identification system 1 described above in terms of the process of generating an image to be displayed on the second display unit 200.

<Processing in Personal Identification System 1A>

Figure 6:
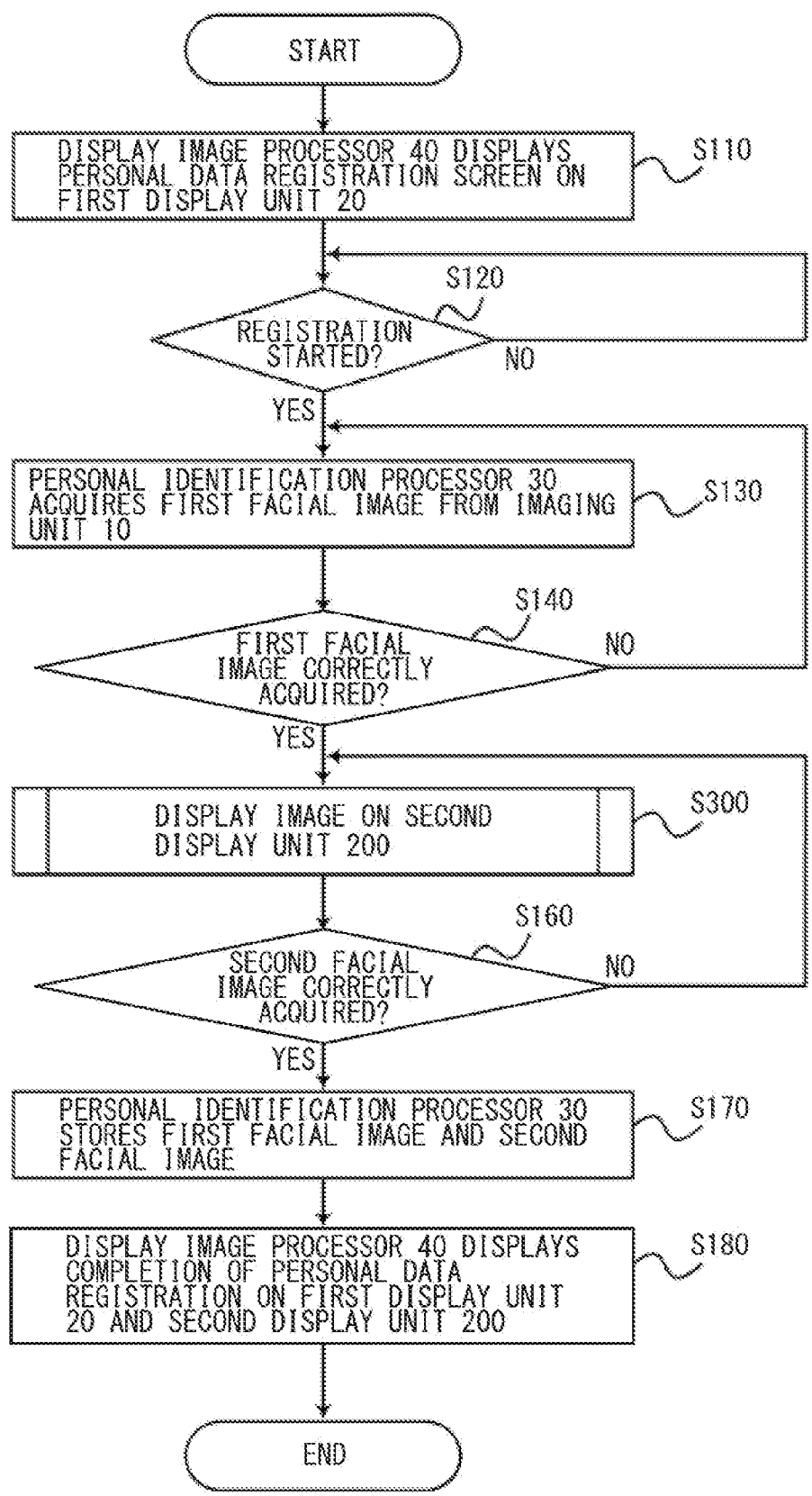
FIG. 6 is a flowchart of personal registration processing, in a personal identification system according to a second embodiment of the disclosure.

As illustrated in FIG. 6, in the processing in the personal identification system 1A, step S150 of the processing flow of the personal identification system 1 illustrated in FIG. 3 is replaced with step S300.

Accordingly, only step S300 is described below.

<Image Processing for Display on Second Display Unit 200 (Step S300)>

Figure 7:
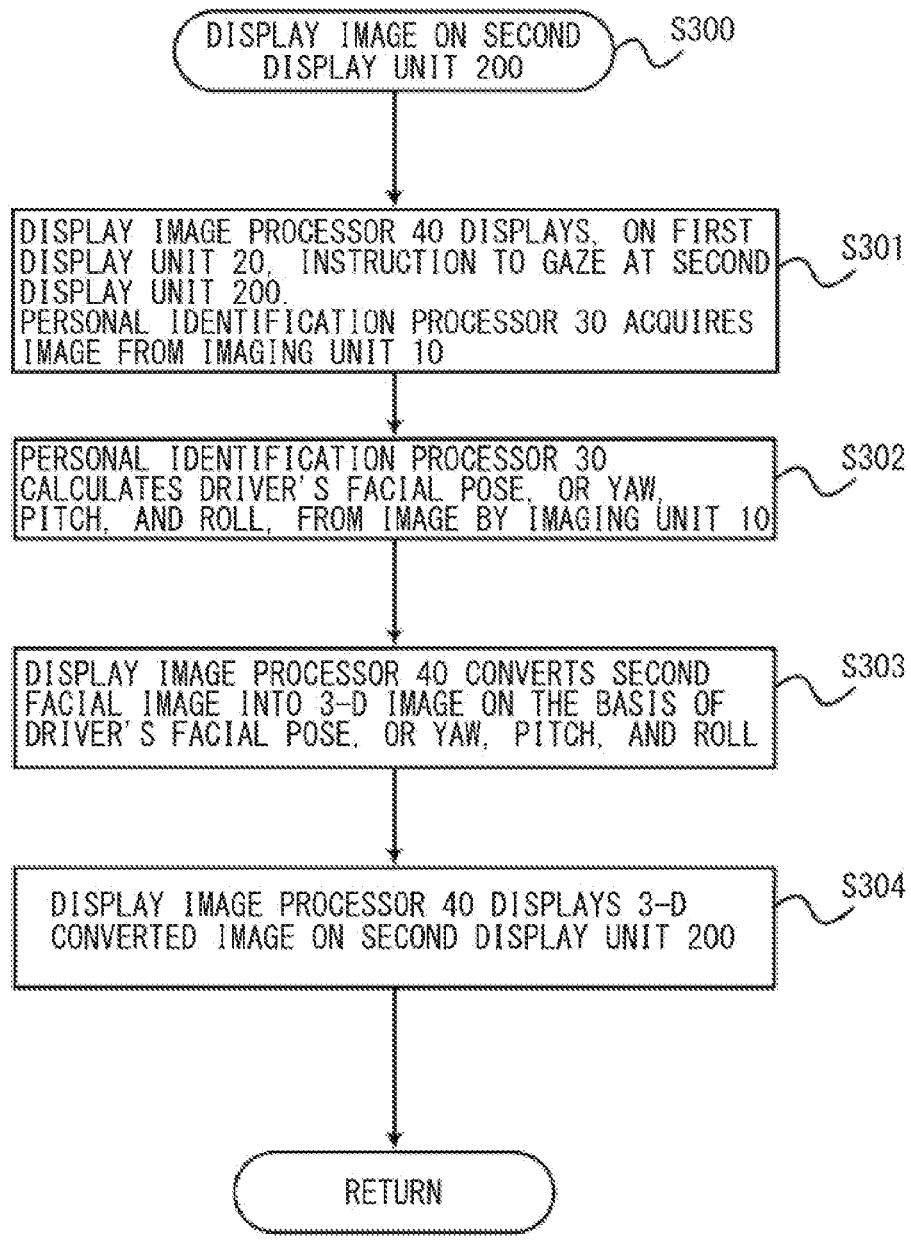
FIG. 7 is a flowchart of image output processing to the second display unit, in the personal identification system according to the second embodiment of the disclosure.

With reference to FIG. 7, described is a process related to image generation for display on the second display unit 200 of the personal identification system 1A and the acquisition of the second facial image.

The display image processor 40 may display, on the first display unit 20, a message to prompt the driver to gaze at the second display unit 200. Thereafter, the personal identification processor 30 may acquire the facial image (second facial image) of the driver from the imaging unit 10 (step S301).

On the basis of the facial image acquired, the personal identification processor 30 may calculate the facial pose (yaw, pitch, and roll) of the driver, and transfer the facial pose data to the display image processor 40 (step S302).

The display image processor 40 may convert the second facial image into a 3-D image on the basis of the transferred facial pose data (step S303).

Thereafter, the display image processor 40 may display the 3-D converted second facial image on the second display unit 200 (step S304).

The facial image (second facial image) of the driver acquired in step S301 is the image captured from the oblique direction. Accordingly, the display image processor 40 may make a viewpoint conversion of the second facial image by a perspective projection conversion, to generate a front-faced facial image of the driver.

Thus, the front-faced facial image of the driver continues to be displayed on the second display unit 200 until the second facial image is correctly acquired.

<Workings and Effects>

In the personal identification system 1A according to this embodiment, on the occasion of the personal registration, the display image processor 40 may display, on the second display unit 200, the image into which the second facial image is converted on the basis of the facial pose data extracted from the second facial image.

That is, in acquiring the second facial image, the front-faced facial image of the driver may be displayed on the second display unit 200. The front-faced facial image of the driver is obtained by the viewpoint conversion of the second facial image by the perspective projection conversion. This encourages the driver to gaze at the second display unit 200 more closely, making it possible to fix uniquely the facial pose and the gaze direction of the driver.

Hence, it is possible to extract precisely the amount of the facial feature of the driver from the second facial image, leading to enhanced precision of the personal identification.

MODIFICATION EXAMPLES

In the personal identification systems 1 and 1A, on the occasion of the personal registration, the display image processor 40 may display, on the second display unit 200, an image that indicates progress of the personal registration.

That is, in acquiring the second facial image, the display image processor 40 may display, on the second display unit 200, an indicator such as a numerical value and a progress bar that indicate the degree of the progress of the personal registration process. This helps the driver to understand how long he or she has to gaze at the second display unit 200, making it possible to fix the facial pose and the gaze direction of the driver uniquely for a certain period of time.

Hence, it is possible to extract precisely the amount of the facial feature of the driver from the second facial image, leading to enhanced precision of the personal identification.

Figure 8:
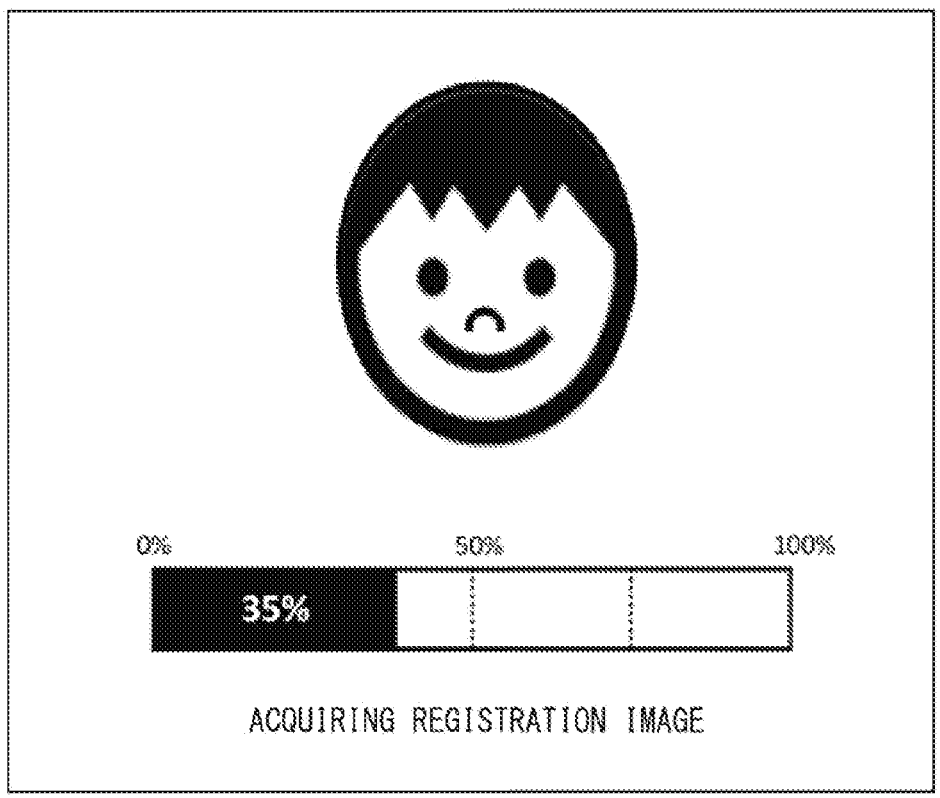
FIG. 8 illustrates an example of an image to be displayed on the second display unit, in the personal identification system according to a modification example of the disclosure.

Moreover, as illustrated in FIG. 8, the indicator such as the numerical value and the progress bar that indicates the degree of the progress of the personal registration process may be displayed simultaneously with the display of, for example, the avatar image described above.

The personal identification systems 1 and 1A of the example embodiments of the disclosure may be realized by recording the processing by the personal identification processor 30 and the display image processor 40 in a recording medium readable by a computer system, and by causing the personal identification processor 30 and the display image processor 40 to read and execute a program held in the recording medium. A computer system as used herein includes an operating system and hardware such as peripheral devices.

In the case with the use of the WWW (World Wide Web) system, the "computer system" also includes an environment that provides and/or displays a website. The program may be transmitted from the computer system in which the program is held in a storage device, etc., to another computer system through a transmission medium or by a transmission wave in the transmission medium. Here, the "transmission medium" that transmits the program refers to a medium configured to transmit data, e.g., a network (communication network) such as the Internet or a communication line such as a telephone line.

Furthermore, the program as mentioned above may be one that realizes a portion of the processing described above.

In addition, the program may be a so-called differential file, or a differential program, that is able to realize the processing described above by a combination with a program already held in the computer system.

Although some example embodiments of the technology have been described in the forgoing byway of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

According to the aspects of the technology, it is possible to acquire a facial image in which a facial pose and a gaze direction of a driver are uniquely fixed, on the occasion of registration of personal data. This leads to precise identification of the driver.

Each of the display image processor 40 and the personal identification processor 30 illustrated in FIG. 1 is implement able by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the display image processor 40 and the personal identification processor 30 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the display image processor 40 and the personal identification processor 30 illustrated in FIG. 1.

The invention claimed is:

1. A personal identification system to be applied to a vehicle, the personal identification system comprising:
   a first display unit provided vehicle-widthwise halfway and vehicle-lengthwise in front of a driver's seat of the vehicle;
   a second display unit fronting onto the driver's seat;
   an imaging unit provided on an outer periphery of the first display unit;
   a display image processor configured to control a display image to be displayed on the first display unit and a display image to be displayed on the second display unit; and
   a personal identification processor configured to make personal registration and personal identification of a driver seated on the driver's seat on a basis of at least a first facial image and a second facial image, the first facial image including an image of the driver's face captured by the imaging unit with the driver's gaze directed toward the first display unit, and the second facial image including an image of the driver's face captured by the imaging unit with the driver's gaze directed toward the second display unit.

2. The personal identification system according to claim 1, further comprising a driving state monitoring device configured to monitor a driving state of the driver, wherein
   the imaging unit, the display image processor, the personal identification processor, and the first display unit are provided in the driving state monitoring device.

3. The personal identification system according to claim 2, wherein
   on an occasion of the personal registration of the driver, the personal identification processor is configured to acquire the first facial image, and afterwards, the display image processor is configured to display an image on the second display unit, and the personal identification processor is configured to acquire the second facial image.

4. The personal identification system according to claim 3, wherein
   the display image processor is configured to display, on the second display unit, an image in which a facial pose of an avatar is controlled on a basis of facial pose data, the avatar being associated with the driver, and the facial pose data being extracted from the second facial image.

5. The personal identification system according to claim 3, wherein
   the display image processor is configured to display, on the second display unit, an image into which the second facial image is converted on a basis of facial pose data extracted from the second facial image.

6. The personal identification system according to claim 3, wherein
   the display image processor is configured to display, on the second display unit, an image that indicates progress of the personal registration.

7. The personal identification system according to claim 4, wherein
   the display image processor is configured to display, on the second display unit, an image that indicates progress of the personal registration.

8. The personal identification system according to claim 5, wherein
   the display image processor is configured to display, on the second display unit, an image that indicates progress of the personal registration.

9. The personal identification system according to claim 1, wherein the second display unit comprises a head-up display.

10. The personal identification system according to claim 2, wherein the second display unit comprises a head-up display.

11. The personal identification system according to claim 3, wherein the second display unit comprises a head-up display.

12. The personal identification system according to claim 4, wherein the second display unit comprises a head-up display.

13. The personal identification system according to claim 5, wherein the second display unit comprises a head-up display.

14. The personal identification system according to claim 6, wherein the second display unit comprises a head-up display.

15. The personal identification system according to claim 7, wherein the second display unit comprises a head-up display.

16. The personal identification system according to claim 8, wherein the second display unit comprises a head-up display.

17. A personal identification system to be applied to a vehicle, the personal identification system comprising:
   a first display unit provided vehicle-widthwise halfway and vehicle-lengthwise in front of a driver's seat;
   a second display unit fronting onto the driver's seat of the vehicle;
   an imaging unit provided on an outer periphery of the first display unit; and
   circuitry configured to
      control a display image to be displayed on the first display unit and a display image to be displayed on the second display unit, and
      make personal registration and personal identification of a driver seated on the driver's seat on a basis of at least a first facial image and a second facial image, the first facial image including an image of the driver's face captured by the imaging unit with the driver's gaze directed toward the first display unit, and the second facial image including an image of the driver's face captured by the imaging unit with the driver's gaze directed toward the second display unit.

* * * * *